United States Patent [19]

Koch

[11] Patent Number: 4,504,753
[45] Date of Patent: Mar. 12, 1985

[54] BIAXIAL ELECTRICAL COMPACT DRIVE, IN PARTICULAR A POSITIONING DRIVE

[75] Inventor: Dietmar Koch, Mülheim, Fed. Rep. of Germany

[73] Assignee: Kraftwerk Union Aktiengesellschaft, Mülheim, Fed. Rep. of Germany

[21] Appl. No.: 417,064

[22] Filed: Sep. 13, 1982

[30] Foreign Application Priority Data

Sep. 17, 1981 [DE] Fed. Rep. of Germany ....... 3137101

[51] Int. Cl.³ .............................................. H02K 7/10
[52] U.S. Cl. ..................................... 310/75 R; 310/80; 310/83; 310/114; 310/118; 74/665 L; 74/665 N
[58] Field of Search ................... 310/75 R, 75 D, 112, 310/118, 113, 191, 114, 79, 80, 82, 83, 90, 254, 261, 209; 74/665 L, 665 N

[56] References Cited

U.S. PATENT DOCUMENTS

| | | | |
|---|---|---|---|
| 1,458,601 | 6/1923 | Tanner | 310/112 UX |
| 2,929,265 | 3/1960 | Musser | 74/640 |
| 3,029,324 | 4/1962 | Couffer | 200/83 Q |
| 3,091,979 | 6/1963 | Schaefer | 74/640 |
| 3,169,201 | 2/1965 | Spring | 310/83 |
| 3,169,202 | 2/1965 | Proctor | 310/83 |
| 3,586,938 | 6/1971 | Le Galc | 310/112 |
| 4,227,092 | 10/1980 | Campagnuolo | 310/80 |
| 4,260,919 | 4/1981 | Fleming | 310/113 |
| 4,351,635 | 9/1982 | Staedeli | 74/665 L |
| 4,375,047 | 2/1983 | Nelson | 310/114 |

FOREIGN PATENT DOCUMENTS

| | | | |
|---|---|---|---|
| 1650714 | 9/1974 | Fed. Rep. of Germany | 310/80 |
| 2295612 | 6/1974 | France | 310/114 |
| 2051495 | 1/1981 | United Kingdom | 310/114 |

OTHER PUBLICATIONS

"Harmonic Drive", Harmonic Drive System, GmbH; 7-78; Langen/Hessen; Germany.

Primary Examiner—R. Skudy
Attorney, Agent, or Firm—Herbert L. Lerner; Laurence A. Greenberg

[57] ABSTRACT

Electrical compact drive, including first and second independently drivable drive shafts, the second drive shaft being in the form of a hollow shaft and the first drive shaft being disposed within the second drive shaft, a first drive motor driving the first drive shaft and having a stator and a rotor, a second drive motor driving the second drive shaft and having a stator and a rotor, and a transmission being connected between the second drive motor and the second drive shaft and having an outer output element and an inner drive element being coupled with the rotor of the second drive motor and being coaxial with the outer output element, the stators of the first and second drive motors, the outer output element of the transmission and the second drive shaft being rigidly coupled together for obtaining synchronism.

8 Claims, 3 Drawing Figures

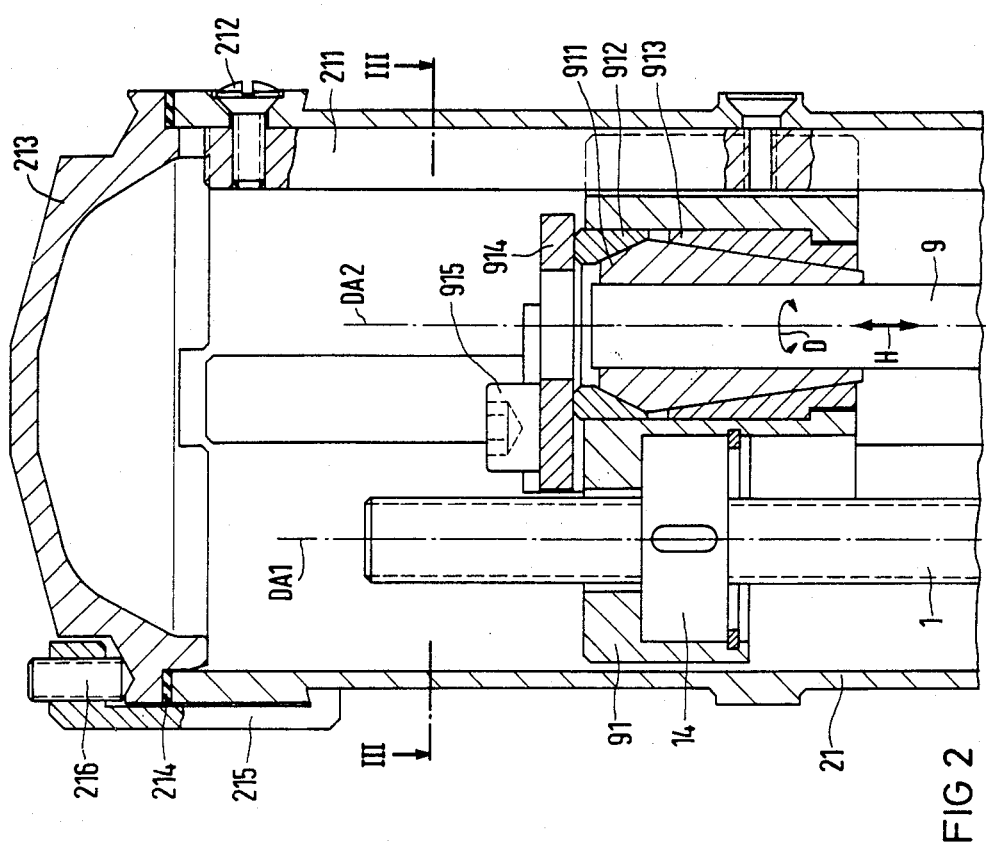
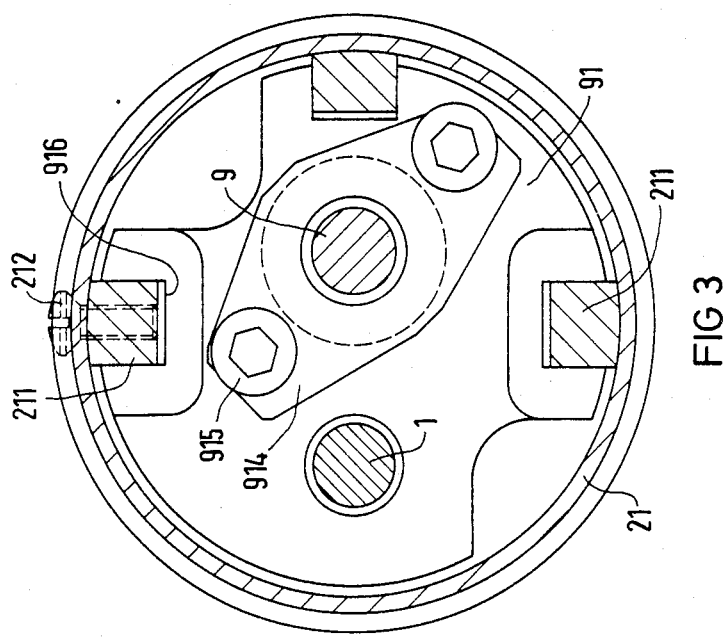

BIAXIAL ELECTRICAL COMPACT DRIVE, IN PARTICULAR A POSITIONING DRIVE

The invention relates to an electrical compact drive, especially a positioning drive, with two drive shafts being drivable independently of each other, the first drive shaft being disposed inside the second drive shaft which is in the form of a hollow shaft.

Such electrical compact drives can be used, for example, as positioning drives for performing positioning tasks in measuring and control technology or in robot technology. It must be possible to execute the positioning movements derived from the two drive shafts entirely independently of each other, that is, mutual influence between the two drives integrated into one compact drive must either be ruled out from the start or must be completely compensated. However, if the first drive shaft is disposed inside the second drive shaft which is in the form of a hollow shaft, so as to obtain as compact a construction as possible, mutual influence between the two drives cannot be ruled out for structural reasons. In this case the first drive shaft mounted in the second drive shaft revolves with the second drive shaft about the axis thereof, and the relative movement between the first drive shaft and the associated drive, leads to an undesired rotation of the first drive shaft.

It is accordingly an object of the invention to provide a biaxial electrical compact drive, especially a positioning drive, which overcomes the hereinafore-mentioned disadvantages of the heretofore-known devices of this general type, which has two drive shafts drivable independently of each other, wherein the first drive shaft is disposed inside the second drive shaft that is constructed as a hollow shaft, and wherein the resulting mutual influence between the two drives is completely compensated.

With the foregoing and other objects in view there is provided, in accordance with the invention, an electrical compact drive, in particular a positioning drive, comprising first and second mutually independently drivable drive shafts, the second drive shaft being in the form of a hollow shaft and the first drive shaft beind disposed within the second drive shaft, a first drive motor driving the first drive shaft and having a stator and a rotor, a second drive motor in the form of a hollow shaft motor driving the second drive shaft and having a stator and a rotor, and a transmission being connected between the second drive motor and the second drive shaft and having an outer output or drive element and an inner drive element being coupled with the rotor of the second drive motor and being coaxial with the outer output element, the stators of the first and second drive motors, the outer output element of the transmission and the second drive shaft being rigidly coupled together for obtaining synchronism.

The invention is based on the finding that to compensate the mutual influence between the two drives, an additional rotary movement which always corresponds to the rotary movement of the second drive shaft, must be forcibly imposed on the first drive motor. This superposed rotary movement is obtained by the fact that through the rigid coupling of the stators of both drive motors, the output element of the transmission, and the second drive shaft, synchronous running of these drive elements is achieved. This synchronism is also forcibly imparted to the rotor of the first drive motor by the holding torque existing between the rotor and the stator. The coupling of the drive elements required for achieving this synchronism is made possible, however, only by the fact that the second drive motor is constructed as a hollow shaft motor and that, due to an appropriate coaxial construction of the transmission, the inner drive element thereof can be coupled with the rotor and its outer output element can be coupled with the stator of the second drive motor.

In accordance with another feature of the invention, there is provided a fixed internally toothed outer ring, the transmission being a tension wave transmission, the inner drive element of the transmission being in the form of a tension wave generator, and the outer output element being in the form of an externally toothed elastic tensioning wheel in engagement with the fixed internally toothed outer ring. The mode of operation of such a tension wave transmission is known, for example, from German Patent DE-PS No. 1 650 714. On one hand, such a transmission has the required coaxial construction of an inner drive element and outer output element and, on the other hand, it can be readily integrated into the compact drive according to the invention because of its compact construction. The fixed outer ring of the tension wave transmission can be coupled with the housing of the compact drive or it can form a component part of this housing.

In accordance with a further feature of the invention, the first drive motor is also in the form of a hollow shaft motor.

In accordance with an added feature of the invention, there is provided a central hollow shaft on which the rotor of the first drive motor is disposed. The advantage of this feature is in particular that the rotor of the first drive motor can be placed on the central hollow shaft having a central bore which, for example, permits cables, flexible tubes, actuating rods and the like to be lead through.

In accordance with an additional feature of the invention, there is provided a gear pair disposed between the central hollow shaft and the first drive shaft, the central hollow shaft driving the first drive shaft through the gear pair.

In accordance with again another feature of the invention, there is provided a lifting and rotating spindle extended through the central hollow shaft.

In accordance with again a further feature of the invention, the lifting and rotating spindle is liftable by rotation of the first drive shaft and is rotatable by rotation of the second drive shaft.

The spindle can thus be displaced in axial direction and it can be rotated about its axis entirely independently thereof.

In accordance with again an added feature of the invention, the second drive shaft includes a hollow shaft portion being eccentrically oriented relative to the axis of rotation of the second drive shaft. Therefore, with a small outside diameter of this hollow shaft portion, the simultaneous accommodation of the first drive shaft and of a lifting and rotating spindle becomes possible.

In accordance with again an additional feature of the invention, there are provided transmission elements respectively connected between the drive shafts and the lifting and rotating spindle, the transmission elements being disposed within the hollow shaft portion of the second drive shaft. This results in an extremely compact positioning drive for a lifting and rotating spindle.

In accordance with a concomitant feature of the invention, the hollow shaft portion has a free end, and includes a cap being disposed on the free end. Therefore, the entire positioning drive can be hermetically sealed.

Other features which are considered as characteristic for the invention are set forth in the appended claims.

Although the invention is illustrated and described herein as embodied in a biaxial electrical compact drive, in particular a positioning drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is a fragmentary, longitudinal-sectional view of the drive of a lifting and turning spindle of the positioning device, through the two shafts of the compact drive; and FIG. 3 is a cross-sectional view taken along line III—III of FIG. 2, in the direction of the arrows.

Figure 1:
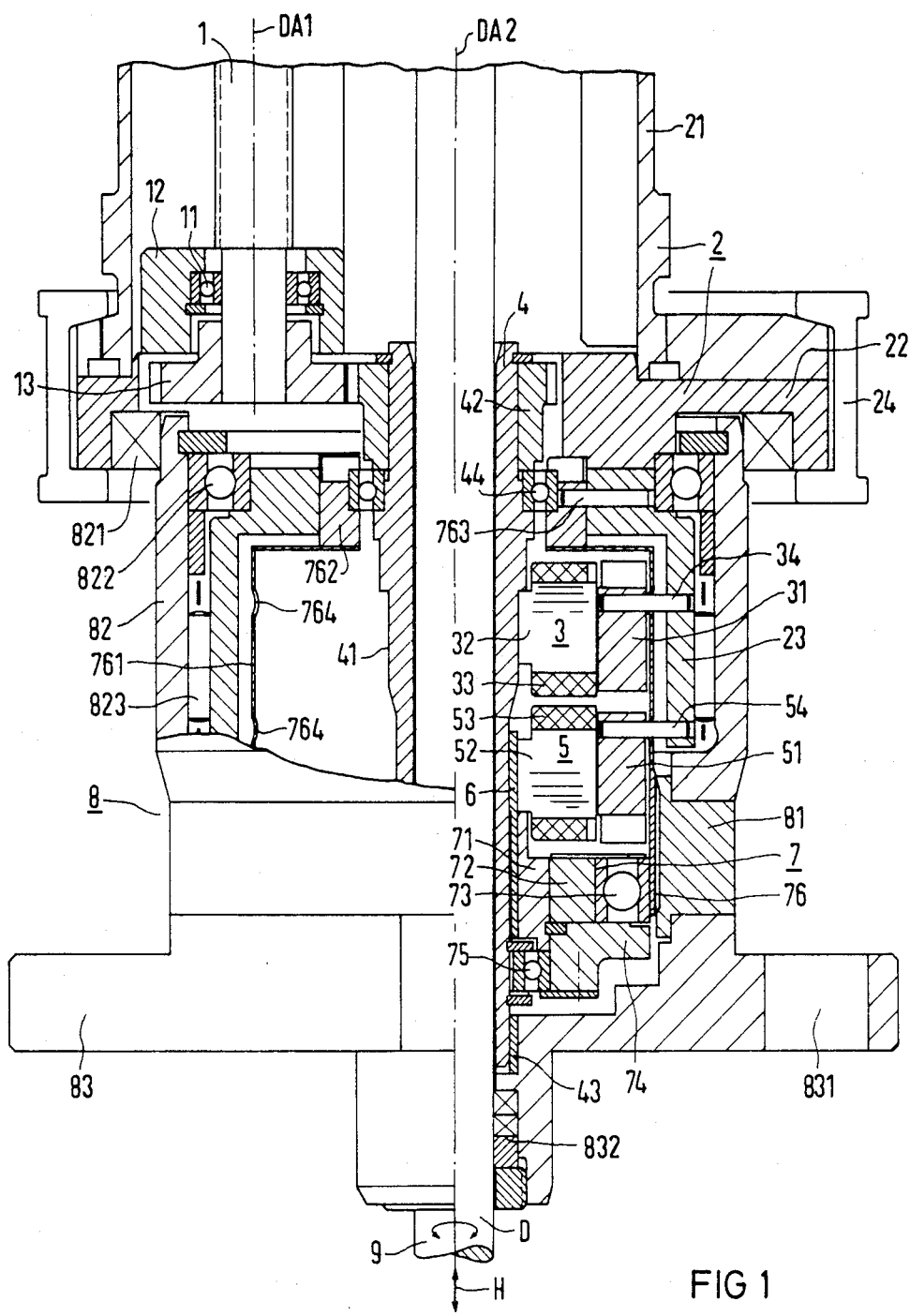
FIG. 1 is a fragmentary, diagrammatic longitudinal-sectional view through the biaxial electrical compact drive of a positioning device.

Reference will now be made to the figures of the drawing, and first particularly to the longitudinal section through the electrical compact drive of a positioning device shown in FIG. 1 thereof. This compact drive has a first drive shaft 1, which is disposed inside a second drive shaft that is in the form of a hollow shaft generally designated with reference numeral 2. In the end region thereof, the first drive shaft 1 passes through a radially grooved ball bearing 11, which in turn is lodged in a bearing support 12 firmly connected to the second drive shaft 2. On one hand, the first drive shaft 1 can therefore rotate about its axis of rotation DA 1, while on the other hand, during rotation of the second drive shaft 2, it revolves about the axis of rotation DA 2 thereof. The second drive shaft 2 is formed of several parts, a tubular hollow shaft portion 21 being followed in axial direction by a hollow shaft support plate 22 and a hollow shaft connecting portion 23. These parts of the second drive shaft 2 are non-rotationally connected together, the connection between the hollow shaft portion 21 and the hollow shaft support plate 22' being effected by straps or supports 24. For reasons to be explained hereinbelow, the hollow shaft portion 21 is eccentrically oriented relative to the axis of rotation DA 2 of the second drive shaft 2.

Associated with the first drive shaft 1 is a first drive motor 3 in the form of a hollow shaft motor. A stator 31 containing permanent magnets, a rotor 32, and a rotor winding 33 of the motor 3 can be seen in the right half of the cross section shown in FIG. 1. The stator 31 is secured in the hollow shaft connecting portion 23 by means of a plurality of centering bolts 34, while the rotor 32 is secured on the seating surface 41 of a central hollow shaft 4. The first drive motor 3 drives the first drive shaft 1 by way of the central hollow shaft 4 and a gear pair including a gear 42 secured on the central hollow shaft 4 and a gear 13 secured on the first drive shaft 1.

Associated with the second drive shaft 2 is a second drive motor 5, which is likewise constructed as a hollow shaft motor. A stator 51 containing permanent magnets, a rotor 52, and a rotor winding 53 of the second drive motor 5 can be seen in the right half of the cross section shown in FIG. 1. The stator 51 is secured in the hollow shaft connecting portion 23 by means of a plurality of centering bolts 54, while the rotor 52 is glued or bonded to the outer surface of a sliding bearing bushing 6 which slides with an inner surface thereof on the central hollow shaft 4. The second drive motor 5 drives the second drive shaft 2 through a coaxially disposed tension wave transmission designated with reference numeral 7 as a whole. A tension wave generator is used as an inner drive element of this tension shaft transmission. The tension wave generator includes a bottom ring 71 glued to the outer surface of the sliding bearing bushing 6, a shaft portion 72 which is secured to the bottom ring 71 and has an elliptical outer contour, and an antifriction bearing 73 mounted on the shaft portion 72. A holding ring 74 secured laterally on the wave generator secures the parts against axial displacement and is in turn retained in radial direction on the central hollow shaft 4 through a radially grooved ball bearing 75. An externally toothed elastic tensioning wheel 76 serves as an outer output or drive element of the tension wave transmission 7. The tensioning wheel 76 includes a toothless axially extended region 761 which is connected to the hollow shaft connecting portion 23 through a holding ring 762 and holding pins 763. The toothless extended region 761 has holes 764 intended for the passage of the centering bolts 34 and 54, respectively. The externally toothed elastic tensioning wheel 76 is in engagement over the major elliptical axis thereof with an internally toothed outer ring 81 which stands still and is a component part of a housing, bearing reference numeral 8 as a whole.

The housing 8 includes the afore-mentioned outer ring 81, a cylindrical housing portion 82, and a housing flange portion 83, the housing flange portion 83 being intended for the attachment of the entire positioning device and having appropriate bores 831. The entire housing 8 is pressure-proof, with the disposition of a gasket 821 between the cylindrical housing portion 82 and the hollow shaft support plate 22, and the disposition of a gland 832 between the housing flange portion 83 and a lifting and rotating spindle 9 extended through the central hollow shaft 4. The second drive shaft 2 is furthermore mounted in the fixed housing 8. To this end, a radially grooved ball bearing 822 is provided between the cylindrical housing portion 82 and the second drive shaft 2, in vicinity of the connection between the hollow shaft support plate 2 and the hollow shaft connecting portion 23, and a needle bearing 823 is provided in vicinity of the hollow shaft connecting portion 23 adjacent thereto. The central hollow shaft 4 is mounted at an end region thereof through a sliding bearing bushing 43 in the housing flange portion 83, while on the opposite side the suspension occurs through a radially grooved ball bearing 44, which is disposed at the level or height of the radially grooved ball bearing 822 between the central hollow shaft 4 and the holding ring 762.

In the compact drive illustrated in FIG. 1, a mutual influence between the two drives would result if, upon rotation of the second drive shaft 2, the gear 13 which would then likewise be revolving about the axis of rotation DA 2, would roll off on the gear 42, thereby causing a rotation of the first drive shaft 1 about the axis DA 1. However, because of the connection of the stator 31 of the first drive motor 3 with the second drive shaft 2, this mutual influence is compensated. Between the stator 31 and the rotor 32 of the first drive motor 3 there exists a holding torque, which can be increased by short-circuiting the rotor winding 33. With the gear 42, the holding torque transmits to the central hollow shaft 4 exactly the rotary movement required for the compensation. A rotation of the first drive shaft 1 about its axis DA 1 thus occurs only when the first drive motor 3 is actuated and a relative movement occurs between its stator 31 and its rotor 32. This independent rotary movement of the first drive shaft 1 is to be transformed into a lifting movement of the lifting and rotating spindle 9, while the rotary movement of the second drive shaft 2 is to be transformed into a corresponding rotary movement of the lifting and rotating spindle 9. In this manner, for example, a measuring instrument or tool disposed at the end of the lifting and rotating spindle 9 can be moved in lengthwise direction of the axis of rotation DA 2 and, independetly thereof, can be rotated to a given angular position. These lifting and turning movements of the spindle 9 are indicated in FIG. 1 by the double arrows H and D.

The current feed to the brushes held in the stators 31 and 51 of the drive motors 3 and 5 can be effected through slip ring transmitters not shown in the drawing. For example, the slip ring transmitter may be disposed between the hollow shaft connecting portion 23 and the cylindrical housing portion 82 of the housing 8. Alternatively, if the rotary movement D is limited to a few revolutions, the current leads may be passed through the wall of the hollow shaft portion 21, since the hollow shaft portion 21 and the stators 31 and 51 revolve synchronously.

The transformation of the rotary movement of the first drive shaft 1 into a lifting movement H of the lifting and rotating spindle 9 and the transformation of the rotary movement of the second drive shaft 2 into a rotary movement D of the lifting and rotating spindle 9 are evident from FIGS. 2 and 3. As can be seen in FIGS. 2 and 3, the transformation is effected by means of a drive 91 which is disposed inside the hollow shaft portion 21 and is fastened on the lifting and rotating spindle 9 for displacement in direction along the axis DA 2. This adjustable attachment is effected through an inner clamping element 911 which includes two oppositely inclined outer cones, and through two outer clamping elements 912, 193, each having a corresponding inner cone. The clamping force is obtained through a collar 914 and two screws 915 held in the driver 91. The transformation of the rotary movement of the first drive shaft 1 into a lifting movement H of the spindle 9 occurs through a nut 14 which is placed on a male thread of the first drive shaft 1 and is held in the driver 91 and secured against rotation. The transformation of the rotation of the hollow shaft portion 21 into a rotary movement D of the lifting and rotating spindle 9, occurs through three driver strips 211 which are oriented parallel to the axis of rotation DA 1, DA 2, respectively, and are attached by screws 212 to the inner periphery of the hollow shaft portion 21. The driver strips 211 are offset relative to each other by an angle of 90 degrees, a high torsion resistance being obtained due to the tubular cross section of the hollow shaft portion 21. These driver strips 211 engage in corresponding U-shaped recesses 916 in the driver element 91, without impeding a displacement corresponding to the lifting movement H.

In the sectional view of FIG. 2 it can also be seen that the free end of the hollow shaft part 21 is closed by a cap 213 and sealed with the aid of a gasket 214. The pressing force required for the seal is provided by clamps 215 and tightening screws 216.

FIGS. 2 and 3 also show that the disposition of the hollow shaft portion 21 eccentric to its axis DA 2 as mentioned above, assists the space saving accommodation of the first drive shaft 1, the spindle 9, and the driver 91 in the interior of the hollow shaft portion 21. In this way, in conjunction with the compact construction of the respective electric drive, the overall size of the entire positioning device can be reduced to a minimum. In the embodiment shown, the largest diameter of the positioning device at the housing flange 83 (FIG. 1) is 110 mm for example, while the overall height of the entire positioning device depends on the required lift H of the lifting and rotating spindle 9.

I claim:

1. Electrical compact drive comprising first and second independently drivable drive shafts, said second drive shaft being in the form of a hollow shaft and said first drive shaft being disposed within said second drive shaft, a first drive motor driving said first drive shaft and having a stator and a rotor, a second drive motor driving said second drive shaft and having a stator and a rotor, a transmission being connected between said second drive motor and said second drive shaft and having an outer output element and an inner drive element being coupled with the rotor of said second drive motor and being coaxial with said outer output element, said stators of said first and second drive motors, said outer output element of said transmission and said second drive shaft being rigidly coupled together for obtaining synchronism, and a fixed internally toothed outer ring, said transmission being a tension wave transmission, said inner drive element of said transmission being in the form of a tension wave generator, and said outer output element being in the form of an externally toothed elastic tensioning wheel in engagement with said fixed internally toothed outer ring.

2. Electrical compact drive according to claim 1, including a central hollow shaft on which the rotor of said first drive motor is disposed.

3. Electrical compact drive according to claim 2, including a gear pair disposed between said central hollow shaft and said first drive shaft, said central hollow shaft driving said first drive shaft through said gear pair.

4. Electrical compact drive according to claim 2, including a lifting and rotating spindle extended through said central hollow shaft.

5. Electrical compact drive according to claim 4, wherein said lifting and rotating spindle is liftable by rotation of said first drive shaft and is rotatable by rotation of said second drive shaft.

6. Electrical compact drive according to claim 1, wherein said second drive shaft includes a hollow shaft portion being eccentrically oriented relative to the axis of rotation of said second drive shaft.

7. Electrical compact drive according to claim 5, wherein said second drive shaft includes a hollow shaft portion being eccentrically oriented relative to the axis of rotation of said second drive shaft, and further including transmission elements respectively connected between said drive shafts and said lifting and rotating spindle, said transmission elements being disposed within said hollow shaft portion of said second drive shaft.

8. Electrical compact drive according to claim 7, wherein said hollow shaft portion has a free end, and including a cap being disposed on said free end.

* * * * *